United States Patent [19]

Arnold

[11] Patent Number: 5,758,216
[45] Date of Patent: May 26, 1998

[54] PRE-RECORDED MOF LAYER INFORMATION PROCESSING SYSTEM

[75] Inventor: Andrew Daniel Arnold, Hilton, N.Y.

[73] Assignee: Eastman Kodak Company, Rochester, N.Y.

[21] Appl. No.: 825,847

[22] Filed: Apr. 4, 1997

Related U.S. Application Data

[63] Continuation of Ser. No. 483,366, Jun. 7, 1995, abandoned.

[51] Int. Cl.[6] .................................................. G03B 17/24
[52] U.S. Cl. .................................................... 396/311
[58] Field of Search .................................... 396/310, 311, 396/319, 429

[56] References Cited

U.S. PATENT DOCUMENTS

| | | | |
|---|---|---|---|
| 4,947,196 | 8/1990 | Wash et al. | 354/76 |
| 4,965,626 | 10/1990 | Robinson et al. | 355/40 |
| 4,994,832 | 2/1991 | Spector | 354/110 |
| 5,072,253 | 12/1991 | Patton | 355/40 |
| 5,111,224 | 5/1992 | Spector | 354/125 |
| 5,124,742 | 6/1992 | Yoshikawa | 355/27 |
| 5,130,745 | 7/1992 | Cloutier et al. | 355/40 |
| 5,155,596 | 10/1992 | Kurtz | 358/214 |
| 5,187,512 | 2/1993 | Kirkendall | 354/120 |
| 5,189,453 | 2/1993 | Boyd | 354/122 |
| 5,189,467 | 2/1993 | Wheeler | 354/110 |
| 5,198,907 | 3/1993 | Walker et al. | 358/296 |
| 5,229,810 | 7/1993 | Cloutier | 354/106 |
| 5,235,369 | 8/1993 | Nakamura et al. | 354/228 |
| 5,319,403 | 6/1994 | Sakamoto et al. | 354/106 |
| 5,344,730 | 9/1994 | Kitamoto | 430/14 |
| 5,461,439 | 10/1995 | Minakuti et al. | 354/106 |
| 5,479,228 | 12/1995 | Tamamura et al. | 354/106 |
| 5,488,445 | 1/1996 | Oi et al. | 354/106 |

*Primary Examiner*—David M. Gray
*Assistant Examiner*—Nicholas J. Tuccillo
*Attorney, Agent, or Firm*—Joseph F. Breimayer; Frank Pincelli

[57] ABSTRACT

A photographic filmstrip of the type having a magnetics-on-film (MOF) layer and having pre-recorded information therein signifying characteristics of the print or Photo CD order to be made from the filmstrip image frames particular to the camera in which the filmstrip was exposed or a pre-paid promotion or the like and a system for use therewith. Special promotions provided to the customer-user related to completion of the customer order are recorded in filmstrip MOF layer tracks by the offering party, e.g. the manufacturer, the dealer or the photofinisher. In one embodiment realized in a single use camera, the special promotion comprises pre-exposed latent images of symbols related to an event or attraction or the offer to have such latent images superimposed during photofinishing in a pre-defined area of the filmstrip image frames. The camera is modified by a mask over the pre-defined image frame area and an image of the symbol in the viewfinder to assist the user in composing a composite scene with the symbol.

6 Claims, 7 Drawing Sheets

FIG. 1 PRIOR ART

PRE-RECORDED ID CODES

| | |
|---|---|
| –PRE-EXPOSED SYMBOL–CARTOON CHARACTER | AG |
| –SUPERIMPOSED SYMBOL–CARTOON CHARACTER | AH |
| –DOUBLE PRINTS–ANY PHOTOFINISHER | AI |
| –DOUBLE PRINTS–QUALEX ONLY | AJ |
| –SUPER SATURATED COLOR PROCESSING | AK |
| –ENHANCED SIZE PRINTS–ANY PHOTOFINISHER | AL |
| –ENHANCED SIZE PRINTS–QUALEX ONLY | AM |
| –FREE POSTER–SEA WORLD | AN |
| –FREE POSTER–DISNEY WORLD | AO |
| –FREE POSTER–MICKEY MOUSE | AP |
| –GALLERY PRINTS–QUALEX ONLY | AQ |
| –PHOTOFILE PRINTS–QUALEX ONLY | AR |
| –SUPERIMPOSED SYMBOL–DISNEY WORLD, QUALEX | AS |
| –PRE-EXPOSED SYMBOL–DISNEY WORLD, QUALEX | AT |
| –PROCESSING PRE-PAID | AU |
| –PHOTO CD PRE-PAID | AV |

PRE-RECORDED MOF LAYER INFORMATION PROCESSING SYSTEM

This is a continuation of application Ser. No. 08/483,366, filed Jun. 7, 1995, now abandoned.

FIELD OF THE INVENTION

This invention relates to a photographic filmstrip of the type having a magnetics-on-film (MOF) layer, and particularly to such a filmstrip having pre-recorded information therein signifying characteristics of the print or Photo CD order to be made from the filmstrip image frames particular to the camera in which the filmstrip was exposed or a pre-paid promotion or the like and a system for use therewith.

BACKGROUND OF THE INVENTION

In commonly assigned U.S. Pat. Nos. 4,947,196, 4,965,626, 5,130,745 and 5,229,810, incorporated herein by reference, a photographic filmstrip having a virtually transparent, magnetic film layer on the non-emulsion side of the filmstrip (referred to as an MOF layer) is disclosed in conjunction with various camera systems. One or more longitudinal read/write tracks are illustrated in the MOF layer between the side edges of the image frame area and the filmstrip where information such as film exposure information and information relevant to the processing and subsequent use (e.g., printing) of the exposed image frames is recorded during exposure of the filmstrip image frames. The camera disclosed therein is provided with a magnetic read/write head for reading out pre-recorded information useful for controlling camera operations recorded in other tracks and for recording on the film edge tracks during camera use. The information recorded during camera use may include voiced messages or sound associated with the photographed scene and may be recorded in digital or analog format on the certain tracks.

Figure 1:
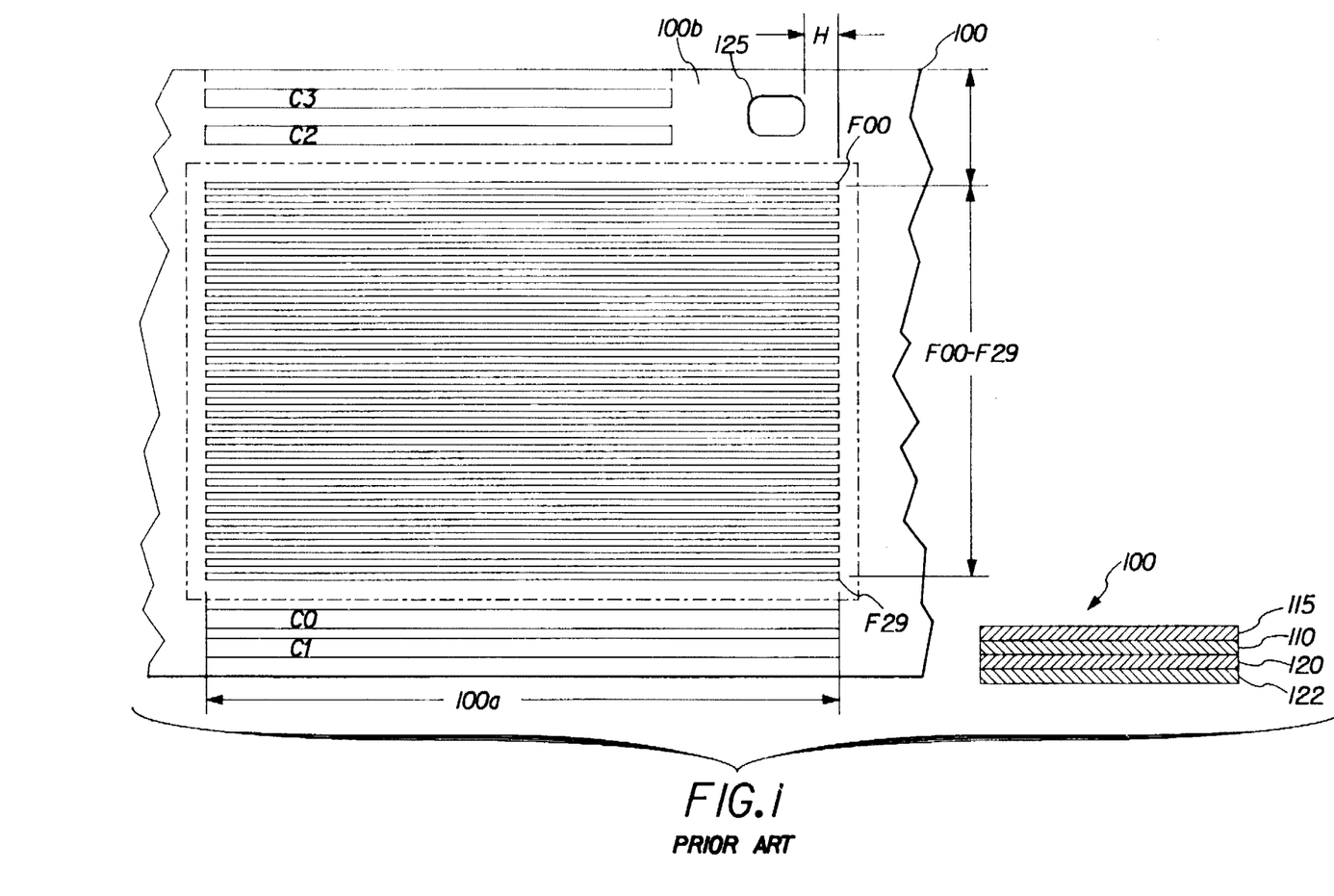
FIG. 1 is a diagram illustrating the parallel dedicated tracks in a virtually transparent MOF layer in a preferred format of the prior art for a filmstrip especially for use in cameras and photofinishing equipment having a magnetic film read/write capability.

Referring now to FIG. 1, the MOF layer 120 on a filmstrip 100 in which such information may be recorded in tracks is depicted. The magnetically coated, color negative filmstrip 100 includes a base 110, various well-known photochemical emulsion layers 115 on one side of the base 110 and a virtually transparent MOF layer 120 on the other side. An anti-static and lubricating layer 122 overlies the MOF layer 120. The filmstrip 100 includes a single perforation 125 along at least one film edge at regular intervals matching the pitch of a metering pawl in a camera adapted to use the filmstrip 100.

For purposes of recording data in the MOF layer 120, each image frame of the filmstrip 100 may be formatted as shown in FIG. 1 (as more fully described in the '745 and '810 patents, the disclosures of which are incorporated herein by reference). The frame area is divided into a plurality of predetermined longitudinal track locations designated in the drawing as outermost tracks C0–C3 and innermost tracks F00–F29. As described more fully in the '810 and '745 patents, certain of the tracks may be reserved for recording of information in the camera using magnetic recording means included in the camera. Other tracks may be reserved for use by the photofinisher, and certain of the tracks may be used for recording of audio information. FIG. 7 of the above-incorporated '810 patent presents is a listing of exemplary data identification codes envisaged for use in the particular data format set forth therein.

As indicated in the above-referenced patents, certain information common to all image frames may be recorded by the camera in dedicated edge tracks C0 and C1 in the filmstrip leader as the filmstrip is automatically advanced and wound on the camera spool on loading of the film cartridge into the camera. Such information can include the camera, camera owner and dealer identifications and a directory of information types to be recorded by the camera, the retail order station and/or the photofinisher and is coded by the data ID codes AA–AF.

Data identifying the filmstrip characteristics, in the form of a DX bar code, and the image frame numbers are typically recorded optically at an edge of the filmstrip and read out during photofinishing. The DX bar code may also be pre-recorded magnetically by the film manufacturer in edge tracks of the MOF layer of the filmstrip leader as described in U.S. Pat. No. 5,344,730. A listing of other recorded data is also presented in the '730 patent.

It is also suggested in the systems proposed in at least some of these patents to allow recording of customer order data entries by the retail dealer in certain tracks before the customer order is forwarded to the photofinisher. A similar system is also shown in further U.S. Pat. No. 5,124,742 where entries made on a mark sheet are optically read out, converted to recording codes and recorded in MOF layer tracks as customer order data by the photofinisher.

The photofinisher is also provided with read/write magnetic recording equipment for reading all of the earlier recorded data in the MOF layer tracks related to the customer order, the filmstrip and camera characteristics, the exposure conditions and so forth to aid in photofinishing. The photofinisher also may record the photofinishing operations undertaken in filling the order in other dedicated tracks of the MOF layer.

It is also proposed to use the MOF layer information recording capability in specialized imaging equipment. For example, U.S. Pat. No. 5,072,253 discloses a business or greeting card formatting and imaging system employing the MOF layer tracks to store instructions for correlating a message to be exposed on one portion of a photographic print paper card with a photographic image, e.g. a portrait, to be exposed on another portion of the card.

Photofinishing of customer print orders and, more recently, Photo CD orders, from negative filmstrips involves a great many coordinated steps in the filmstrip developing and printing operations to ensure high quality in the resulting images and conformance in print numbers, types and billing of the order. The diversity of camera systems, film types and the advent of recyclable, single use camera types and the proliferation of uses of such cameras in specific marketing promotions has multiplied the complexity of accurately completing customer orders. Most large or traditional photofinishers employ a "batch" computer to do order tracking and billing, or to handle information about a specific customer order in order batches of 50 to 100 photofinishing orders that are sorted by distinguishing characteristics requiring different processing or printing.

Customer photofinishing order information is written or carried on an order envelope enclosing the film cartridge when the orders are returned to the photofinisher. The order information typically includes the customer name and address, the number of prints to be made, the size and finish of the prints, the film type, size and nominal number of filmstrip frames and additional special handling information. Certain promotions related to the price to be charged size and type of prints, no-charge duplicate prints or the like may be printed on the order envelope or indicated by a separate coupon. The envelope also typically has a unique order number that is bar coded to be machine read and used for order tracking.

An order data record for a particular order is created when the customer envelope arrives at the photofinisher, and the unique bar code order number is scanned in from the envelope. Certain other coded information may also be read in, including the film cartridge DX bar code. Any other information about the order written on the envelope, usually by the customer, has to be entered manually. Then the magnetically recorded data has to be read out as the filmstrip is withdrawn from the cartridge, and the MOF layer is passed by a magnetic read head.

There is no easy method of conveying to the photofinisher a special promotion that was offered to the customer by the film manufacturer, single use camera manufacturer, or a particular dealer unless a coupon is enclosed in the envelope and manually entered into the batch computer memory along with the other order data. The coupons are subject to loss or may be overlooked or the data related thereto may be mis-interpreted.

Recently, single use camera packages or film cartridges have been offered for sale that include a pre-exposed promotional image frame that may be offered at no print cost as disclosed in commonly assigned, co-pending U.S. patent application Ser. No. 08/228,843 to James Boyd et al. When such cameras are returned for processing, the film cartridge is removed, and the pre-exposed image frame is processed with the image frames exposed by the customer. In this system, there is no possibility to merge the pre-exposed image with an image of a scene selected by the camera user.

In a further commonly assigned U.S. Pat. No. 5,189,453, a system is disclosed for pre-exposing a latent image of indicia, figures, drawings or corporate logos in the image frames of a filmstrip loaded into a single use camera. The image frames are then exposed to scenes composed by the customer-user, and the resulting composite images are processed and printed by a photofinisher. While the exposure of the image is always in the same location, it appears that the image captured in use of the camera is superimposed over the pre-exposed latent image. Unless the image captured by the camera in the superimposed area is of a single, contrasting color, the resulting double exposure image may not be aesthetically pleasing.

The variety and complexity of filmstrip types, camera types, special promotions and printing options available increase the likelihood that errors will be made in completing a customer order. The opportunities presented by the capability of recording information in the filmstrip MOF layer to simplify and render these operations less subject to error have not yet been exhausted.

SUMMARY OF THE INVENTION

Accordingly, it is an object of the present invention to utilize the capability of pre-recording information into dedicated tracks of the filmstrip MOF layer specific to a particular special promotion accompanying the purchase of the film cartridge separately or in a single use camera.

In a first aspect of the present invention a system employing an elongated photographic filmstrip packaged within a film cartridge and adapted for use in a camera, comprises: an external package displaying promotional and instructional information visible to the camera user in use of the filmstrip in a camera; and said filmstrip having a section of pre-recorded information which may be read out by a photofinisher and employed in the processing of the filmstrip and completion of a customer order in accordance with the promotional information appearing on the external package.

Preferably the filmstrip further comprises a magnetic layer and at least one set of data magnetically recorded in said magnetic layer storing instructions for processing said filmstrip and completing a customer order in compliance with the promotional information appearing on the external package. In one aspect, the special promotion may be enjoyed when the order is completed by a specific photofinisher.

Order information that can be conveyed to the photofinisher by the pre-recorded special promotion information includes special handling or promotions, e.g. the following:

If the film when purchased includes the price of processing and printing.

If any special services were included with the film purchase, such as Photofile, Gallery, write-on prints, Photo CD, or bonus prints.

If free enlargements, posters, special promotional prints or other promotions are included with the order.

If a pictorial image, character, figure, drawing or the like is to be superimposed in the image frames of the filmstrip.

In any of the above, if a condition applies, e.g. an expiration date and/or specific photofinisher honoring the special handling.

Other information that can be conveyed by the pre-recorded special promotion information to the photofinisher includes additional alternative special handling in conjunction with a recyclable, single use camera offered for sale with the special promotion identified on the package. In addition, in one particular promotion, the single use camera viewfinder may be supplied with a superimposed image, e.g. a full color cartoon character or celebrity image therein, (hereafter referred to as a symbol) for posing with photographed subjects and/or scenes. The pre-recorded information in the filmstrip MOF layer identifies the camera and the superimposed image which, when read out by the photofinishing equipment, may be selected and exposed on the prints with the captured image.

A similar process may be followed employing conventional cameras loaded with special promotion filmstrips identifying the image and with peel off transparencies for the camera viewfinder applied. In either case, only those photofinishers having the capabilities of reading the pre-recorded information to identify the superimposed image and of exposing the superimposed image can complete the film order.

Advantages of the Invention

The ability to obtain this particularized special handling or promotion information automatically from the pre-recorded information is a great advantage in time savings and more importantly increases the probability of fulfilling the print order without errors introduced by the customer or the transcription of the customer's order information.

BRIEF DESCRIPTION OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

As described above, when the customer order is received in a photofinishing retail establishment or plant, the information on and in a customer order envelope is entered as a customer order. The film cartridge is then separated from the customer envelope for processing. The customer envelope bar code is employed to track the order.

Typically, in an automated photofinishing system, the DX bar code on the film cartridge shell is then read by a DX bar code reader located in an automatic filmstrip splicer, such as a Gretag® Ultima or Ultimax splicer. The primary reason for reading the DX bar code at the splicer is to insure that the incorrect film type does not get spliced into a filmstrip batch to be processed and printed together. For example, it would be disastrous to splice and subsequently process a roll of Kodak® Kodachrome® film in a batch of Kodak® Kodacolor® film. Not only would the film be ruined, but the process would contaminated. The splicer compares the film cartridge DX bar code to the bar code for the film type and rejects film cartridges that are the incorrect film type for the batch of filmstrips being spliced together into a film roll for common processing and printing.

As the film cartridge DX bar code is read out at the splicer, it is also entered into the data base related to the envelope bar code. Then the filmstrip is sorted into an appropriate batch, spliced together and processed to fulfill the special handling or promotion. This batch order information is thereby linked to the customer information that was entered into the computer at the original order entry work station via the bar code on the customer envelope. Since the same computer or a linked computer network is used to perform these functions, the order tracking history for a specific order is updated at this time.

It is also at this point that information about the customer's order can be entered by magnetically reading the data tracks of the filmstrip and decoding the special handling or promotion.

Figure 2:
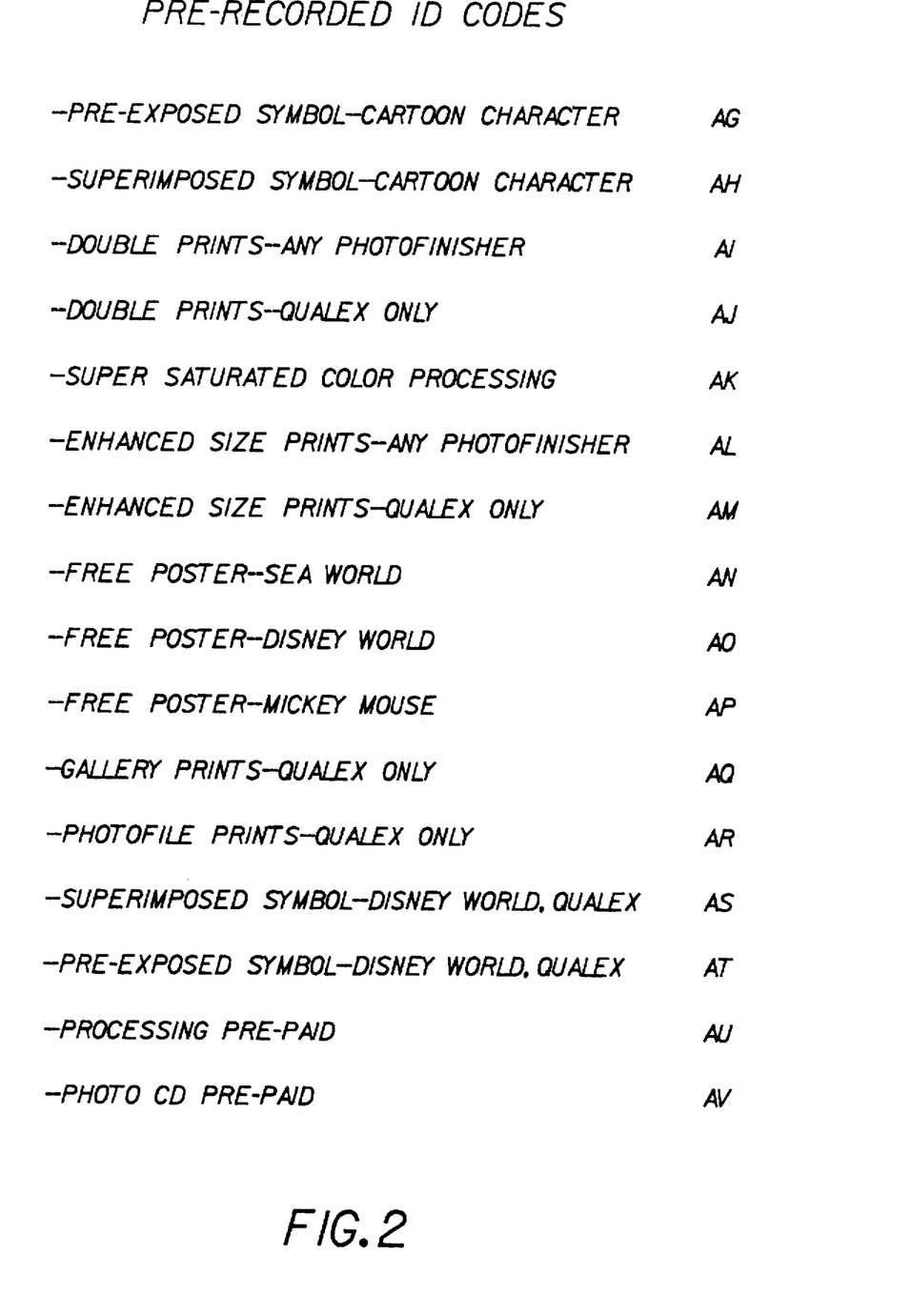
FIG. 2 illustrates a table of ID coded special promotion data recorded in the MOF layer tracks of FIG. 1 in accordance with the various embodiments of the present invention for conveying special instructions for processing and completing a customer order in regard to a special promotion.

Turning now to FIG. 2, it is a listing of the codes of an enhanced data architecture of the present invention. The two letter ID codes are of the format described above with respect to FIG. 7 in the above-incorporated '745 patent starting with ID code AG. The ID codes and the information fields making up the ID coded special promotion data are recorded in dedicated MOF layer tracks as described below. Then, during processing, the ID coded special promotion data is magnetically read out and each such listed special promotion provides an instruction to the photofinisher as to the completion of the customer order. FIG. 2 is exemplary of some but not necessarily inclusive of all special promotions that may be offered to a customer-user by a manufacturer, dealer or photofinisher or of all that are described herein.

Figure 3:
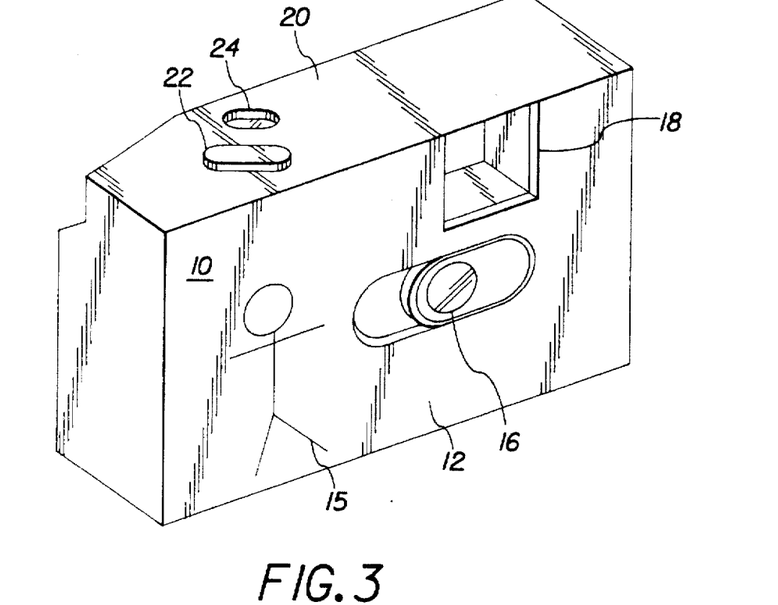
FIG. 3 is a front view of a single use camera package exhibiting the features of a special promotion corresponding to one of the recorded special promotion data.
Figure 4:
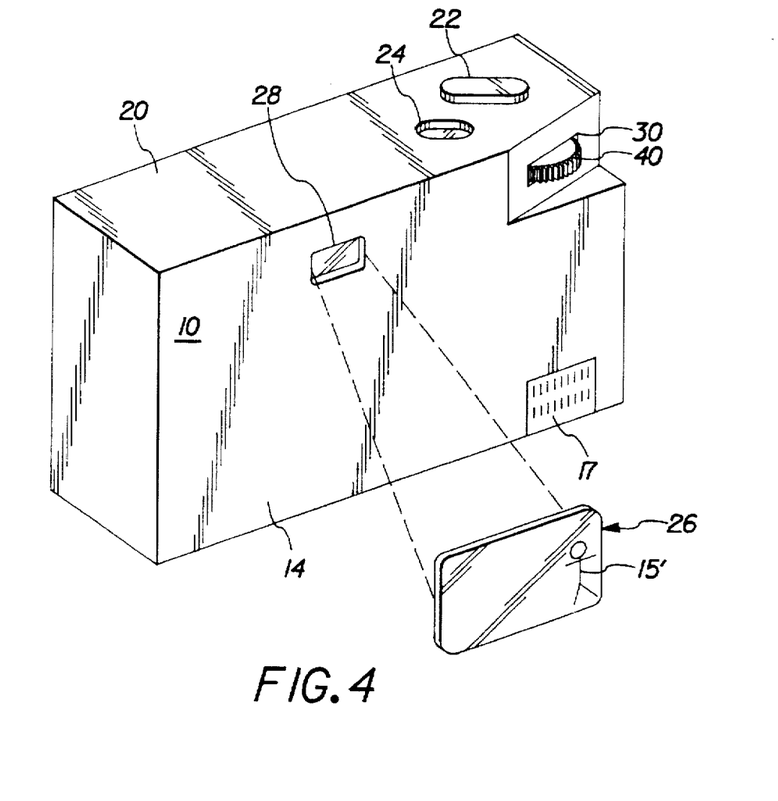
FIG. 4 is a back view of the single use camera package and an eyepiece template transparency for use by a customer-user in framing a scene to be captured with a pre-exposed character or a super-imposed character.

Referring now to FIGS. 3 and 4, they show schematically a lens-fitted, recyclable, single use camera of a type known in the prior art in accordance with a first aspect of the present invention involving several embodiments thereof and the ID coded special instruction data AG and AH. The camera body is formed of plastic and is encased in an exterior camera package 10 illustrated with trademarks and graphics of the manufacturer. The camera package 10 comprises a main front cover section 12, a back cover section 14, a top section 20 and side and bottom sections which surround a light-tight, box shaped, camera body. The main front cover section 12 is provided with apertures for exposing the taking lens 16 and the viewfinder window 18 of the enclosed camera body. The top section 20 has a pair of apertures therein for receiving the shutter release button 22 and for viewing the underlying exposure counter wheel number 24, respectively, of the enclosed camera body. An aperture for the viewfinder eyepiece 28 is provided in the back cover section 14 for the camera viewfinder window 18. A thumbwheel opening 30 allows a thumbwheel 40 to be exposed to be rotated by the user to advance the filmstrip to the next image frame to be exposed. A film package of this type presently available from Eastman Kodak Company as the Fun Saver 35 and in other similar configurations.

In this aspect of the invention, first and second receptacles in the camera housing in package 10 are loaded with a filmstrip having one or more of the ID coded special promotion data of FIG. 2 pre-recorded in the MOF layer tracks thereof and the filmstrip cartridge, respectively. In conjunction with one or more special promotions, for example, those conforming to ID codes AG, AH, AS, or AT, a symbol 15 is printed on the front cover section 12.

Special promotion instructions 17 are printed on the back cover section 14 (or elsewhere), and these printed images comprise promotional and instructional information for the intended use of that particular camera. The purchaser is thereby able to understand the nature of the special promotion, and the customer order can be filled in accordance with the promotional information from the pre-recorded information on the filmstrip.

For example, the special promotion may specifically comprise the ID code AG for an specific amusement park cartoon character symbol 15 that is pre-exposed in each image frame in a specific image frame area in a manner described in the above-referenced '453 patent or as described below. In this case, the camera package 10 may also be supplied to the customer with a transparent overlay 26 having the same character symbol 15' pre-printed thereon adhering over the viewfinder eyepiece 28. In practice, the symbol 15' on the overlay 26 may be difficult to focus on in use, and, in the single use camera embodiment, it is preferred that the symbol 15' be incorporated within the viewfinder, rather than on an overlay 26 for ease of framing the scene and for manufacture of the single use camera. The customer-user can in either case frame a scene to be photographed including the latent image of the character 15' with the exposed image to produce a composite image in print or Photo CD format when the image frame is processed and the customer order is completed.

Similarly, if the camera system is intended to be employed with a superimposed latent image exposure of the designated symbol made during photofinishing, then the filmstrip 100 would be pre-recorded in the MOF layer with the ID code AH or AS special promotion data or information. The same promotional character symbol 15' and instructional information 17 may be employed as described above for the customer-user to employ in framing scenes to be captured in the image frames. Then, as a preliminary step during photofinishing, the ID code AH, AS or the like may be read out to identify any special promotions. The filmstrip having such a recorded ID code may be diverted to a batch to be first exposed to the superimposed latent image in a manner described below in relation to FIG. 7 to create a composite image to be printed in a conventional photograhic method. Alternatively, the superimposed image may be digitally created as described below with respect to FIG. 8.

Figure 5:
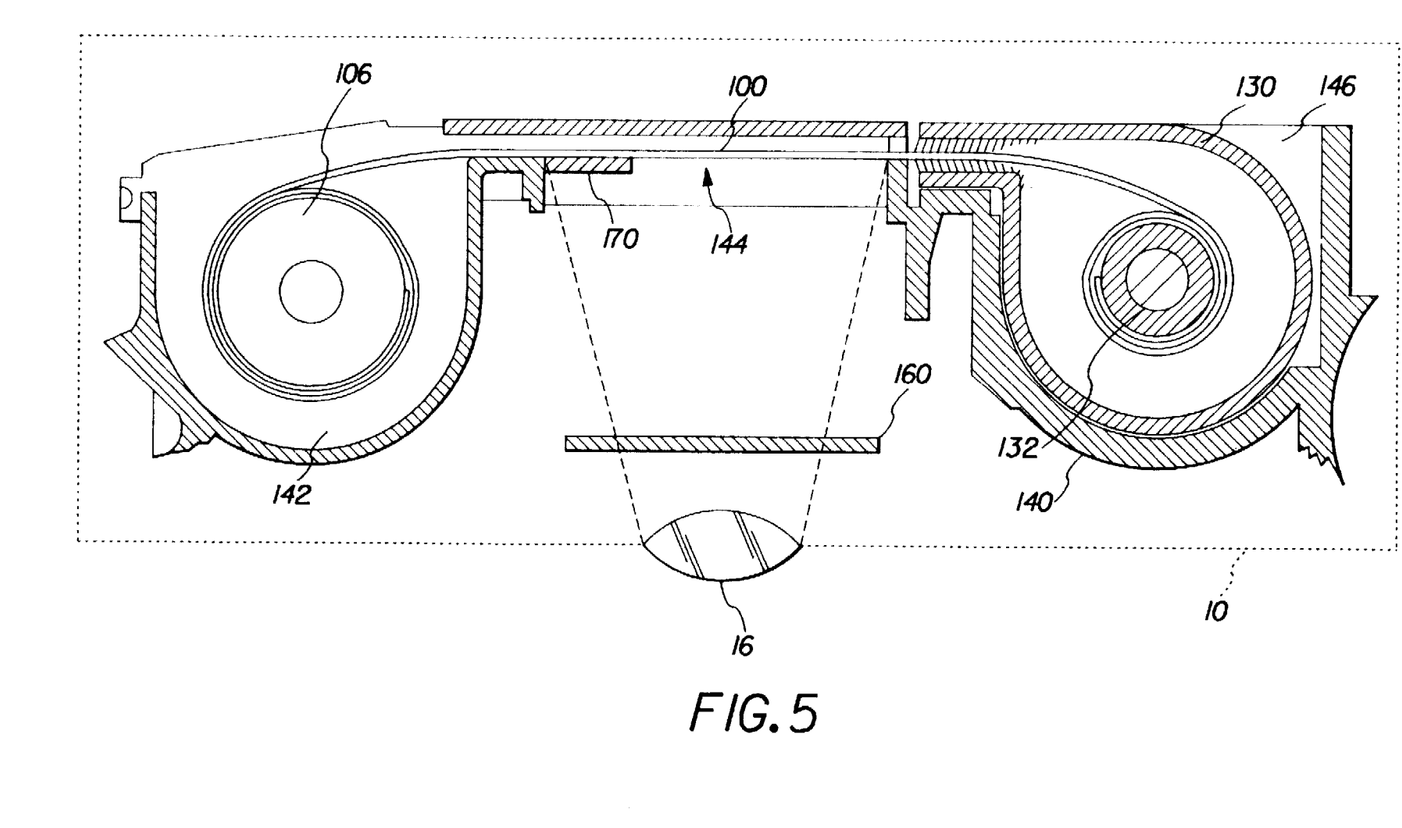
FIG. 5 is a schematic top view of the interior components of the single use camera of FIGS. 3 and 4.

In single use cameras of the type shown in FIGS. 3–5, when the user is ready to take a picture, the film advance thumbwheel 40 protruding through opening 30 is wound in the direction indicated on the camera package 10 until it stops. In that process, the thumbwheel 40 advances a thumb driving sprocket which in turn moves a cam causing a picker to decrement the counter wheel by one count. When the last exposure image frame is exposed, the user is instructed to continue to wind the thumbwheel 40 until the counter reads zero which ensures that the exposed image frames are wound completely into the film cartridge. Since there is no mechanism provided to withdraw the filmstrip from the cartridge, the camera mechanism is not re-usable by the average amateur photographer. Thereafter, the entire package 10 is submitted to the photo-finisher for developing the filmstrip and making prints as indicated above.

Turning now to FIG. 5, it depicts a cross-section top view of the camera package 10 including the major components of the camera mechanism within a light-tight, plastic camera body 140 which is otherwise not fully illustrated for purposes of simplifying the illustration. FIG. 4 of the above referenced '453 patent, incorporated by reference in its entirety, depicts further details of the mechanism of a typical single use camera for advancing the filmstrip 100 from a filmstrip roll 106 in a first receptacle 142 across the camera exposure gate 144 and into the film cartridge 130 positioned in a second receptacle 146 by operation of the thumbwheel 40. The camera body 140 includes the taking lens 16 defining an exposure opening, the exposure gate 144, and a shutter mechanism 160 interposed therebetween. The shutter mechanism 160 includes a shutter blade, trigger latch and sprocket (not shown) which are actuated after an unexposed image frame is advanced into the exposure gate 144 upon depression of the shutter release button 22 by the camera user as described in detail in the '453 patent, for example.

In accordance with this aspect of the present invention, the exposure gate 144 is partly masked in a pre-defined area by the mask 170. The pre-defined area masked by mask 170 corresponds to the area of the filmstrip image frame that is either pre-exposed with a latent image of the promotion symbol 15 on the camera package 10 or will be exposed with that latent image during photofinishing.

Figure 6:
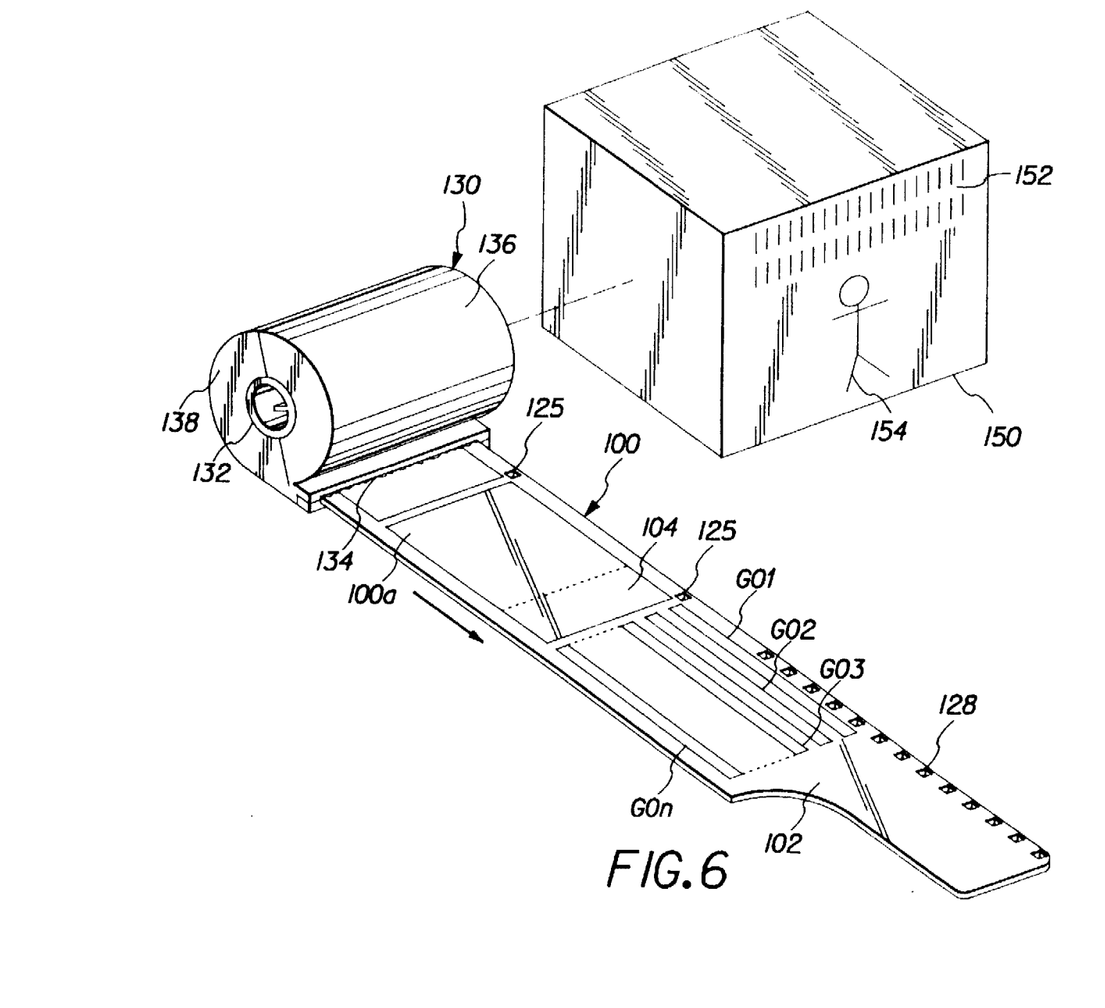
FIG. 6 is a schematic view of the film cartridge and filmstrip in accordance with the invention recorded with ID coded special promotion data recorded in MOF layer tracks and depicting a pre-defined area of the filmstrip image frames wherein a symbol latent image may be pre-exposed or superimposed in correspondence with a special promotion.

The camera mechanism as described above and illustrated in FIGS. 3–5 represents one environment in which at least two embodiments of the present invention may be practiced. In accordance with one preferred embodiment of this aspect of the present invention, the filmstrip 100 is pre-exposed with the latent image in the area 104 during the manufacture thereof, and the ID coded special promotion data, e.g. ID codes AG or AS, is recorded in MOF layer tracks G01–G0n as depicted in FIG. 6. The recording of the special promotion data in tracks G01–G0n and the exposure of the latent image may be accomplished employing a mechanism of the type depicted in the schematic block diagram of FIG. 7 as described below.

In a second embodiment, the symbol latent image is not pre-exposed in the image frame area 104. Instead, the symbol image is added to a composite image in the same area during photofinishing. The symbol is either superimposed into the area 104 by a photographic exposure station as described below in reference to FIG. 7 or is electronically inserted into a digitized data set scanned from the image frame and used to make digital prints or to record a photo CD as described below with respect to FIG. 8.

Turning to FIG. 6, the filmstrip leader 102 and a first image frame 100a of filmstrip 100 are depicted withdrawn from the light tight opening 134 of the film cartridge 130. Film cartridge 130 includes a cartridge shell 136 extending between the end plates 138 and enclosing the hub 132 in a manner well known in the art. Film cartridge 130 is preferably of the thrust type having a light tight door opening 134 that can be opened to advance the filmstrip out of or back into the cartridge. In this regard, the cartridge hub 132 may be engaged by a drive member (not shown) and rotated in both directions to assist in ejecting or retracting the filmstrip out of and back into the door opening 134. The various embodiments of the invention may also be practiced with the standard film cartridges of the 35 mm type.

The filmstrip leader 102 includes the closely spaced perforations 128 for automatic film advance mechanisms used in cameras, and the tracks G01–G0n which, in accordance with this embodiment of the present invention, are recorded with the ID coded data identifying the special promotion to the photofinisher. It will be understood that the track size, number of tracks and placement on the filmstrip leader 102 depicted in FIG. 6 are arbitrary and not to scale.

The specific information so recorded in the embodiments described above with respect to the single use camera of FIGS. 3–5 includes that information encoded by ID codes AG, AH, AS or AT, for example, of FIG. 2. Of course other ID coded special promotion data, e.g. those listed by the other ID codes set forth in FIG. 2, may also be recorded in the MOF layer tracks G01–G0n as additional promotions.

The other special promotions may also be realized in typical single use cameras without the information of ID codes AG, AH, AS, AT or the like recorded on the MOF layer tracks and without the special promotion data mask 170 and symbol 15'. In this embodiment, the filmstrip 100 with the recorded ID coded special promotion data may be packaged in a single use camera package 10 of FIGS. 3 and 4 with promotional and instructional information printed thereon (or on a further outer package, hanger, separate sign or the like) showing or describing the specific promotion being offered by the manufacturer or dealer.

FIG. 6 also illustrates a further aspect of the invention realized in several embodiments, wherein the filmstrip 100 and cartridge 130 are not intended to be used in a single use camera and with the image frame area 104 pre-exposed or to be exposed with a latent symbol image or digitally combined to form a composite print or Photo CD image with the symbol appearing therein. In this aspect, the filmstrip 100 may be wound into the cartridge 130 and placed in film package 150 for shipping to retail dealers. Film package 150 includes the graphics, text and colors typically employed to identify the brand, manufacturer, film speed, and type of film in a manner well known in the art. Again, the ID coded special promotion data recorded in one or more tracks G01–G0n may be displayed on the film package 150 as instructional information area 152 in any suitable manner to inform the customer as to the nature of the special promotion. The special promotion may alternatively be conveyed to the customer by any other manner associated directly or indirectly with the film package 150, particularly in those cases not involving a pre-exposed symbol or composite print.

As will be described below in conjunction with the system of FIG. 8, it will also be appreciated that in a further embodiment of this aspect of the invention, composite prints with symbols of the type described above may also be realized through digital processing and printing techniques. In this case, the special promotion filmstrip package 150 may contain a temporary overlay 26 of the type shown in FIG. 4 to be placed by the customer-user over the camera viewfinder eyepiece. The user can then frame the scenes to be captured in relation to the symbol in the expectation that the symbol will appear in the resulting prints or Photo CD. In this manner, the special promotion can be realized in a typical, permanent camera simply by purchasing and using the film package 150 and the camera need not be permanently modified.

Figure 7:
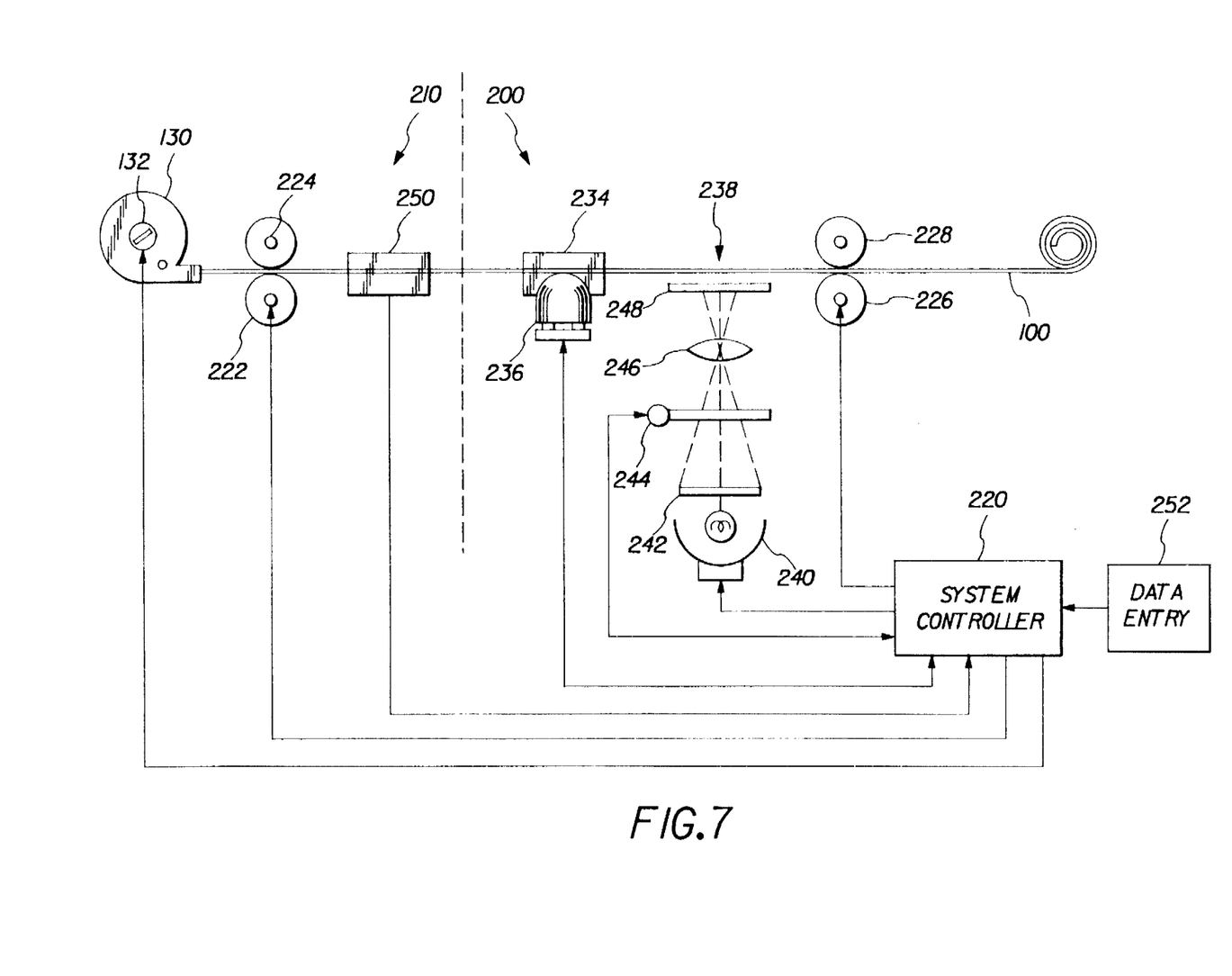
FIG. 7 is a schematic view of a sub-system for reading or writing ID coded special promotion data in the MOF layer tracks and a system for pre-exposing latent images of a symbol into the pre-defined areas of the image frames or for superimposing latent images of the same in the image frames.

Turning to FIG. 7, it illustrates an exemplary magnetic recording and symbol latent image exposure system 200 (including a recording only sub-system 210) for recording the ID coded special promotion data in the tracks G01–G0n by the manufacturer at the time of manufacture or by the dealer or photofinisher at the time that the film cartridge is purchased or turned in to a dealer for processing. FIG. 7 also shows the system employed by the manufacturer for making latent image exposures of the pre-defined areas 104 of one or more of the image frames 100a for the first variation of the first embodiment exemplified by the ID codes AG, AT or the like.

In the former case, which is applicable to any of the embodiments of the pre-recorded promotional information listed by ID code in FIG. 2 and recorded in tracks G01–G0n of a filmstrip 100 loaded into film package 150 or into the single use camera of FIGS. 3–5, the filmstrip 100 is partly withdrawn from the cartridge 130 and advanced past a perforation sensor 250. Advancement is effected by commands from the system controller 220 applied to a mechanism for opening the film cartridge door opening 134 and rotating the hub 132 to eject the filmstrip leader and drive it between first driven roller 222 and idler roller 224. A drive roller motor (not shown) rotates driven roller 222 and idler motor 224 in a first direction in response to drive signals received from the system controller.

The filmstrip leader is then advanced between the backing support 234 and the magnetic read/write head 236, and magnetic recording in the tracks G01–G0n is effected by signals applied to magnetic recording read/write head 236 from the system controller 220. The lengths of the tracks G01–G0n are controlled by signals received from the perforation sensor 250. The specific ID coded recording signals are input to the system controller 220 by any suitable data entry station 252. After the tracks are recorded, the first drive motor direction is reversed to drive the filmstrip 100 back into the cartridge 130, and the door opening 134 is closed. As mentioned above, this sub-system 210 of the system 200 depicted in FIG. 7 is intended to be used by the manufacturer but may also be separately implemented in a stand alone device for use by a film dealer when a film cartridge is sold to record a special promotion for the customer. Similarly, when a filmstrip is returned for processing, the ID coded special promotion data may also be recorded by the dealer or photofinisher using the same sub-system 210 in the stand alone device.

Turning to the latter case, which is exclusively applicable to the embodiments of FIGS. 3–5 as described above, the complete system 200 of FIG. 7 allows the manufacturer to expose the pre-defined areas 104 of one or more image frames 100a to the symbol 15 of the type described above used in the special promotion. In order to do so, the filmstrip 100 is advanced in a dark enclosure out of the cartridge door opening and the tracks G01–G0n are recorded with the ID code AG, AT or the like special promotion data as described above using sub-system 210. Then, the filmstrip image frames are advanced an image frame at a time through a latent image exposure station 238 and between the second motor driven roller 226 and idler roller 228 to present each area 104 of each image frame to be exposed into the exposure gate 248. The latent image is exposed in each image frame area 104 each time the filmstrip image frame is clamped in the exposure gate 248. The exposure is effected through the opening and closing of the shutter 244 which is operated by signals from the system controller 222. The transparency 242 containing the symbol to be imaged in area 104 is illuminated by light source 240, and the image is projected in focus on the area 104 by the imaging lens 246 each time the shutter 244 is opened. When all of the designated areas 104 are exposed in this fashion, the motor driven rollers 222 and 226 and the hub 132 are operated in the second direction to retract the filmstrip back into the film cartridge. The door opening 134 is then closed under control of the system controller 220.

Of course, in this latter case, greater productivity for larger volume runs may be realized in a system that effects the recording and the exposure of the latent images in the filmstrip 100 before it is severed into the film cartridge lengths and attached to the film cartridges 130.

The sub-system 210 of FIG. 7 may also be employed at the photofinishing plant or lab to read out the pre-recorded ID coded special promotion data from tracks G01–G0n and decode the manner of completing the customer order in accordance therewith. In addition, the full system 200 of FIG. 7 may be employed by the photofinisher in the completion of a customer order in accordance with the special promotion listed in FIG. 2 as ID codes AH, AS (or the like), that is, with the superimposition of a latent image in one or more image frame area 104.

In the former case, the filmstrip 100 is ejected from the filmstrip cartridge 130 by opening the cartridge door opening and rotating the cartridge hub 132 by a drive member (not shown) in response to a command from the system controller 220. The filmstrip 100 is advanced between the first driven roller 222 and idler roller 224 which are rotated in a first direction by a first drive motor command from system controller 220. Filmstrip advance is metered by signals from the perforation sensor 250, and the ID coded special promotion data in tracks G01–G0n is read out by magnetic read/write head 236. Other recorded information of the types described in the '810 and '745 patents are read out, stored and employed in the photofinishing operations.

If the read out special promotion information indicates a special promotion not requiring the exposure of the superimposed latent images, then the filmstrip 100 is retracted and sorted into an appropriate batch for processing and printing in accordance with the particular special promotion. If the read out special promotion reveals that the special promotion symbol is to be exposed as a superimposed latent image in the pre-defined areas 104 of the filmstrip image frames, then the filmstrip image frames are advanced into the latent image exposure station 238 and the appropriate symbol containing latent image transparency 242 is placed into its holder in the optical path. The superimposed latent image is exposed in each area 104 each time the filmstrip advance is halted through the operation of the shutter 244 which is opened and closed by signals from the system controller 220. The transparency 242 containing the symbol to be imaged in area 104 is illuminated by light source 240, and the image is projected in focus on the area 104 by the imaging lens 246 each time the shutter 244 is opened. During such exposures, the exposure gate 248 masks over the previously exposed area of the filmstrip image frames. When all of the designated areas 104 are exposed in this fashion, the motor driven rollers 222 and 226 and the hub 132 are operated in the second direction to retract the filmstrip 100 back into the film cartridge 130.

The completion data is entered into data entry 252, and the completion of the exposure of the superimposed latent image may be recorded in one of the tracks G01–G0n by repeating the advancement of the filmstrip leader past the magnetic read/write head 236 as the data is written in. Then the filmstrip 100 may be finally retracted back into the film cartridge 130 and placed into an appropriate batch for developing and printing either as photographic prints or as Photo CD recordings in any of the well known manners.

The present invention may also be practiced employing digital recording of the image frames with the composite image in any of the known media or formats. For example, in order to create a Photo CD or to use a digital print engine to reproduce a video image or a printed image, respectively, of a filmstrip image frame, it is necessary to scan and digitize the content of the image frame to produce a tri-color image data set. The image data set may be mathematically processed to drive the Photo CD recorder or a color laser printer, a thermal dye transfer printer or any other digital print engine using conventional graphics processing software.

In this regard, the superimposition of a selected image into a scene captured by the user in a selected area of the print made or Photo CD image generated from the composite scene may be readily achieved using digital scanning and recording or printing techniques. The photofinisher having such equipment and software on hand can provide the composite images after reading out the special promotion information magnetically recorded on the filmstrip MOF layer tracks as described above.

Figure 8:
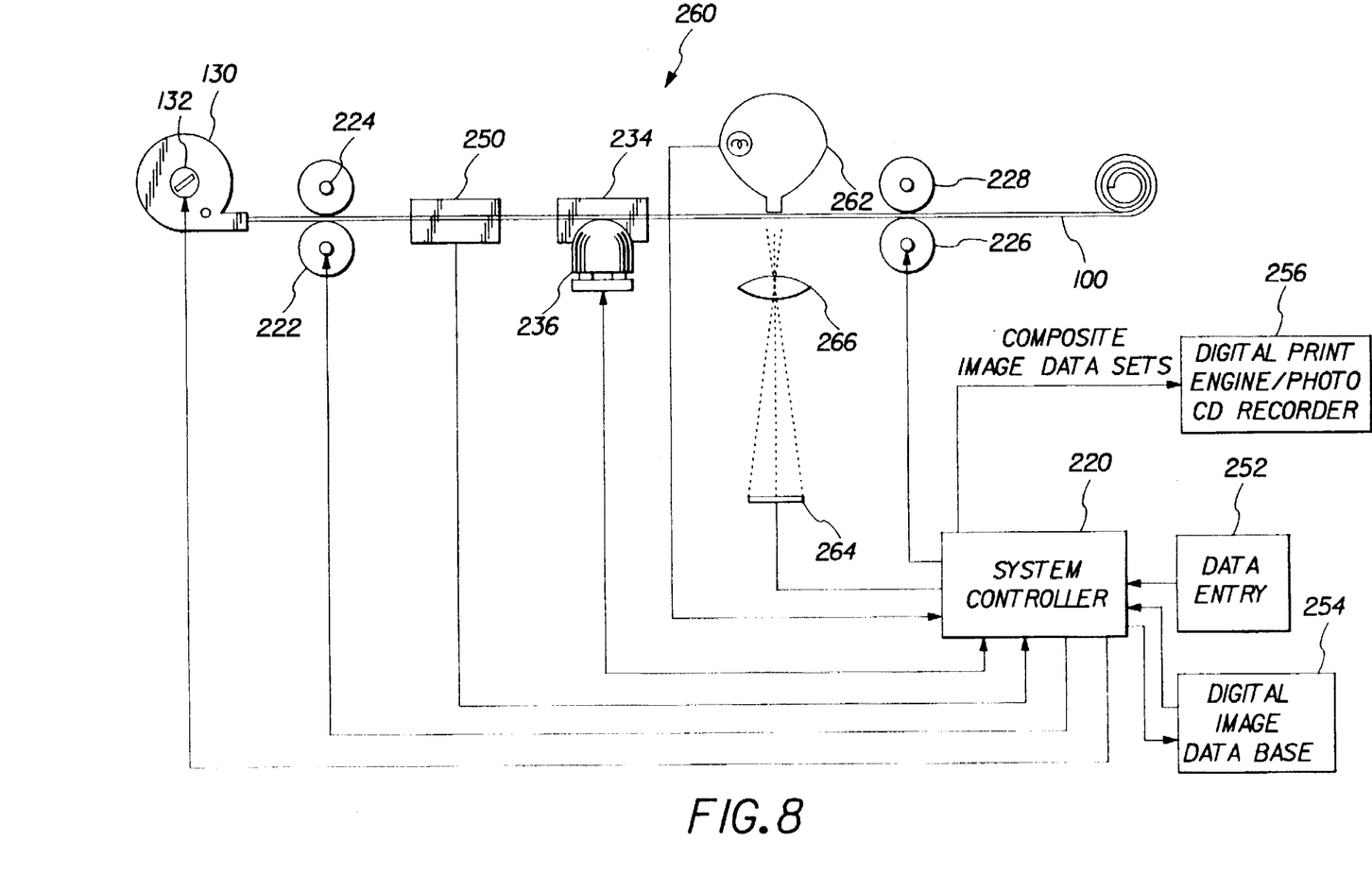
FIG. 8 is a schematic view of a system for reading special promotion information in designated MOF layer tracks, scanning and digitizing the image frames as image frame data sets and substituting or enhancing symbol images in pre-defined areas of the image frames through manipulation of the image frame data sets.

Turning to FIG. 8, a scanner and image processor are depicted in a system 260 for processing the scanned image frame data sets and substituting a data sub-set representing the symbol and its background for a data sub-set of the image frame data sets. The composite data set may be forwarded to a print engine or Photo CD recorder for digitally printing or recording the composite image.

In FIG. 8, the filmstrip 100 is advanced and the leader MOF layer tracks read out and stored in system controller 220 as described above. The filmstrip image frames are scanned digitally by illuminating linear light source 262. The illuminated scan line is projected by lens system 266 onto tri-color linear CCD sensor array 264. As the filmstrip 100 is advanced, each scan line data set is clocked out from tri-color scanner CCD array, digitized and stored in memory in system controller 220. Such a film scanner is described, for example, in commonly assigned U.S. patent application Ser. No. 201,282 filed Feb. 16, 1994 and entitled "Film Scanner with In-Line Dual Scanning Gates" and in commonly assigned U.S. Pat. No. 5,155,596, incorporated herein by reference.

In the case where superimposition of the symbol into the captured scene is intended, the read out special promotion information instructing the creation of a composite image is employed to identify and retrieve the digital symbol data sub-set from the digital image data base memory 254. The corresponding scanned data sub-set of each scanned image frame data set is identified, and the symbol data sub-set is substituted therefore to provide a composite image data set. The composite image data sets may then be conventionally processed to employ in a print engine/Photo CD recorder 256 to reproduce the composite scene. As described above, print engine 256 may be of any of the known types for making a photographic or photographic appearing print or to record the composite scene to Photo CD for video display.

The digital scanning process of FIG. 8 may also be employed with any of the available image processing software to enhance pre-exposed composite image frames. For example, in the camera embodiment of FIGS. 3–5, the mask 170 is employed to provide the pre-defined area 104 of the filmstrip image frame in which the pre-exposed image or the superimposed image appears. If the camera mask 170 is not exactly aligned with the border of the pre-exposed image, a vertical streak will appear in the image frames following film development. The system of FIG. 8 may be employed to identify such streaks in the image frame data sets and substitute either the background data bits of the pre-exposed symbol image or adjacent exposed image data bits.

Moreover, the system of FIG. 8 may advantageously be employed to restore or enhance the symbol image in the double exposure composite image created by the camera and system described in the above-incorporated '453 patent. As described above, the image frame area in which the symbol is pre-exposed in the '453 patent is not masked in the camera, and a double exposure occurs when the camera is used to capture a scene image. In accordance with this aspect of the present invention, the filmstrip 100 of FIG. 6 may be employed in the camera of the '453 patent wherein the filmstrip used therein is first recorded with the ID coded special promotion data to identify the symbol in accordance with the present invention.

In use of the system of FIG. 8 with this variation, the ID coded special promotion data is read out, and the symbol is identified. After scanning and digitizing the image frame data set, at least one data point location of the identified symbol may be determined by analysis of each image frame data sub-set in the pre-defined area. A simple shape and color matching algorithm may be employed to locate the outline of the symbol and to identify the data bits representing the double exposure of the symbol and the scene. A further boundary area surrounding the symbol outline may optionally be identified to fill in with a background. Such a system is described in commonly assigned U.S. Pat. No. 5,198,907 (used for a different purpose) incorporated herein by reference. Then, a data sub-set representing the symbol, and optionally providing a background in the boundary area, may be substituted for the scanned and digitized data bits of the double-exposed symbol and scene.

The system of FIG. 8 is especially useful in highly automated photofinishing plants. In use of such a system, it is generally not necessary to first read out the ID coded special promotion data to sort the filmstrips and cartridges into separate batches. Instead, the filmstrips may be separated from the cartridges, spliced together and developed as a film roll. The developed film roll may then be passed through a magnetic track reading and film scanning system as depicted in FIG. 8 for performing the above described operations. In those filmstrips where the read out special instructions do not prescribe the creation of a composite image, then that operation is not conducted.

In all of these applications of the systems of FIGS. 7 and 8, the filmstrip 100 is required to contain pre-recorded special promotion information that is first read out to identify the specific photofinishing operations to undertake to fill the customer order. In all of these approaches, the data related to each customer order maintained in the batch computer is updated with the read-out special promotion information and any steps taken in accordance therewith. All of the order completion information is recorded in the specified MOF layer tracks as described in the '810 and '745 patents to provide a record of the steps undertaken in response to the special promotion information.

In a further embodiment of the invention, cameras of the type having a magnetic recording capability and a recording input mechanism for the camera user to employ may be enhanced by the capability of recording special promotion information of the types listed above in particular filmstrip MOF layer tracks. For example, a camera owner may be supplied with an ID code for a fee or as a cost free special promotion to enter through the camera's data entry interface. The camera itself may then record the special promotion information as the filmstrip leader 104 is advanced past the camera magnetic read/write head of the type depicted in the above-referenced '196 patent. Such special promotions may include the superimposed images as well as the other special promotions listed in FIG. 2 or described above except for the pre-exposed symbol latent images.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–8 camera package 10
front cover section 12
back cover section 14
symbol 15
taking lens 16
instructional information area 17
viewfinder window 18
top section 20
shutter release button 22
exposure counter wheel number 24
transparent overlay 26
viewfinder eyepiece 28
thumbwheel opening 30
thumbwheel 40
color negative filmstrip 100
image frame 100a
filmstrip leader 102
pre-defined latent image area 104
filmstrip roll 106
base 110
photo-chemical emulsion layers 115
virtually transparent MOF layer 120
anti-static and lubricating layer 122
single perforation 125
multiple perforations 128
film cartridge 130
hub 132
light tight cartridge door opening 134
cartridge shell 136
cartridge end 138
light-tight, plastic camera body 140
first receptacle 142
camera exposure gate 144
second receptacle 146
film package 150
instructional information area 152
symbol 154
shutter mechanism 160
mask 170
recording and symbol latent image exposure system 200
recording only sub-system 210
system controller 220
first driven roller 222
first idler roller 224
second driven roller 226
second idler roller 228
backing support 234
magnetic write head 236
latent image exposure station 238
exposure light source 240
symbol containing latent image transparency 242
shutter 244
imaging lens 246
exposure gate 248
perforation sensor 250
data entry station 252
digital image data base memory 254
print engine/photo cd recorder 256
reproducing and digitizing system 260
linear light source 262
tri-color ccd sensor array 264
lens system 266

I claim:

1. A method of processing photographic filmstrips to fulfill a photofinishing order, the filmstrips being of the type having a series of exposed image frames and a magnetic layer thereon containing pre-recorded promotional information identifying an image of a symbol and the defined area of the exposed image frames in which the symbol image is to be substituted for the exposed image in that defined area such that composite images including the symbol in scenes composed by the camera user will appear in the reproductions made to satisfy the photofinishing order, the method comprising the steps of:

advancing the filmstrip in a film transport path such that the magnetic layer is aligned with a magnetic read head and the image frames are aligned with a film scanner;

operating said magnetic read head to magnetically read out the pre-recorded promotional information from the magnetic layer for use in processing the filmstrip and filling the customer order, the magnetically read out information including the identity of the symbol image and the defined area of the image frame in which the symbol image is to appear in the reproductions made therefrom;

operating said film scanner to scan the filmstrip image frames and provide a digitized image frame data set for each scanned image frame therefrom;

from the magnetically read out defined area information, identifying an image frame data sub-set corresponding to the physical area in the image frame where the identified symbol is to be superimposed;

substituting the digital symbol image data sub-set for the corresponding sub-set of the digitized image frame data set to provide a composite image data set; and reproducing the composite image from the composite image data set.

2. Apparatus for processing photographic filmstrips to fulfill a photofinishing order, the filmstrips being of the type having a series of exposed image frames and a magnetic layer thereon containing pre-recorded promotional information identifying an image of a symbol and a defined area of the exposed image frames in which the symbol image is to be substituted for the exposed image in that defined area such that composite images including the symbol in scenes composed by the camera user will appear in the reproductions made to satisfy the photofinishing order, the apparatus comprising:

a magnetic read head;

a film image frame scanner for scanning the exposed image frames to derive a digitized image frame data set for each scanned image frame;

means for advancing the filmstrip in a film transport path such that the magnetic layer is aligned with a magnetic read head and the image frames are aligned with said film scanner;

means for operating said magnetic read head to magnetically read out the pre-recorded promotional information from the magnetic layer as the magnetic layer is advanced in alignment with said magnetic read head for use in processing the filmstrip and filling the customer order, the magnetically read out information including the identity of the symbol image and the defined area of the image frame in which the symbol image is to appear in the reproductions made therefrom;

means for operating said film scanner to scan the filmstrip image frames as the filmstrip image frames are advanced in alignment with said film scanner and to provide a digitized image frame data set for each scanned image frame therefrom;

means for identifying an image frame data sub-set corresponding to the physical area in the image frame where the identified symbol is to be superimposed from the magnetically read out defined area information;

means for substituting the digital symbol image data sub-set for the corresponding sub-set of the digitized image frame data set to provide a composite image data set; and means for reproducing the composite image from the composite image data set.

3. The apparatus of claim 2 wherein said filmstrip is provided to the photofinisher in a single use, photographic camera of the type comprising:

a light-tight camera housing supporting a shutter, an exposure lens through which an exposure on a filmstrip image frame in an exposure gate is made when the shutter is operated by actuation of a shutter release member, a viewfinder for viewing a scene to be captured on actuation of said shutter release member, said camera housing having a first receptacle on one side of the shutter opening for receiving a filmstrip roll and a second receptacle for receiving a filmstrip cartridge, said filmstrip being disposed in a roll in said first receptacle and extended across said exposure gate and to said filmstrip cartridge disposed in said second receptacle.

4. The apparatus of claim 3 wherein:

said single-use camera is provided to the consumer in an external package displaying promotional information relating to said image of a symbol to appear in said identified area of the image frames of said filmstrip such that composite images may be composed by the camera user that will appear in reproductions made in the photofinishing process.

5. The apparatus of claim 4 wherein:

said single-use camera further comprises masking means in said exposure gate for masking said identified area from exposure to a scene captured on actuation of the shutter release member, and;

means positioned with respect to the camera viewfinder for allowing the camera user to visualize the pre-exposed symbol in the identified area of a scene to be captured in the image frame and in association with other components of the scene selected by the camera user.

6. A method of exposing and processing a photographic filmstrip to fulfill a photofinishing order comprising reproductions having an image of a symbol appearing therein in a defined area comprising the steps of:

packaging a filmstrip with a magnetic layer thereon containing pre-recorded information identifying an image of a symbol and the defined area of at least one exposed image frame in which the symbol image is to be substituted for the exposed image in that defined area in a single-use camera package;

in a display accompanying the single use camera, informing the camera user of the symbol and the defined area of the image frame in which it is to appear in a reproduction of the at least one exposed image frame;

exposing the image frames to scenes composed by the camera user; and making reproductions of the exposed image frames having the symbol superimposed in the at least one exposed image frame in the defined area through the further steps of:

magnetically reading out the pre-recorded information from the magnetic layer for use in processing the filmstrip and filling the customer order, the magnetically read out information including the identity of the symbol image and the defined area of each image frame in which the symbol image is to appear in the reproduction made therefrom;

digitizing the filmstrip image frames and providing a digitized image frame data set for each exposed image frame therefrom;

from the magnetically read out defined area information, identifying an image frame data sub-set corresponding to the physical area in the exposed image frame where the identified symbol is to be superimposed;

substituting the digital symbol image data sub-set for the corresponding sub-set of the digitized exposed image frame data set to provide a composite image data set; and reproducing the composite image from the composite image data set.

* * * * *